(12) United States Patent
Yuksel (10) Patent No.: US 11,679,874 B2
(45) Date of Patent: Jun. 20, 2023

(54) METHOD OF CONTROLLING AN ACTIVATION SYSTEM, EMERGENCY CONTROL SYSTEM, AND AIRCRAFT EQUIPPED WITH SUCH SYSTEM

(71) Applicant: Volocopter GmbH, Bruchsal (DE)

(72) Inventor: Burak Yuksel, Esslingen (DE)

(73) Assignee: Volocopter GmbH, Bruchsal (DE)

(*) Notice: Subject to any disclaimer, the term of this patent is extended or adjusted under 35 U.S.C. 154(b) by 512 days.

(21) Appl. No.: 16/844,098

(22) Filed: Apr. 9, 2020

(65) Prior Publication Data
US 2020/0331590 A1 Oct. 22, 2020

(30) Foreign Application Priority Data
Apr. 16, 2019 (EP) ..................................... 19169586

(51) Int. Cl.
*B64C 39/02* (2023.01)
*B64D 31/10* (2006.01)
(Continued)

(52) U.S. Cl.
CPC ............ *B64C 39/024* (2013.01); *B64D 31/10* (2013.01); *H02P 5/46* (2013.01); *H02P 29/028* (2013.01); *B64U 10/13* (2023.01); *H02P 2101/30* (2015.01)

(58) Field of Classification Search
CPC . B64C 39/024; B64C 2201/027; B64C 27/08; B64D 31/10; H02P 5/46; H02P 29/028; H02P 2101/30; G05D 1/101
See application file for complete search history.

(56) References Cited

U.S. PATENT DOCUMENTS 10,112,727 B1 * 10/2018 Cutler ..................... B64C 13/16
2006/0266881 A1 * 11/2006 Hughey .................. B64C 27/08
244/17.23
(Continued)

FOREIGN PATENT DOCUMENTS

DE   102008022895 A1 * 11/2009 ........... B64C 27/001
EP   2781980            9/2014

*Primary Examiner* — Bickey Dhakal
(74) *Attorney, Agent, or Firm* — Volpe Koenig (57) ABSTRACT

A method of controlling an overly determined actuator system that has a first number of actuators ($\alpha_i$) which is greater than a second number of the actuators needed to perform a predetermined physical task. The method includes: automatically controlling the first number of actuators by a control unit (CU) for jointly performing the predetermined physical task; repeatedly checking a functional state of the first number of actuators to detect an actuator failure of any one thereof; in case of any detected actuator failure, generating at least one emergency signal (EM) representative of an adapted physical task to be performed by a remaining number of the actuators. The emergency signal is generated based on kinematics of the actuator system, on known physical capacities at least of the remaining actuators, and optionally on a computational performance model of the actuator system. The adapted physical task includes activating each of the remaining actuators below a predetermined threshold of maximum physical load on a respective actuator and activating the ensemble of remaining actuators in a way to prevent further damage to the actuator system. An emergency control system and an aircraft are also provided.

14 Claims, 5 Drawing Sheets

(51) Int. Cl.
   *H02P 29/028*   (2016.01)
   *H02P 101/30*   (2015.01)
   *H02P 5/46*     (2006.01)
   *B64U 10/13*    (2023.01)

(56) References Cited

U.S. PATENT DOCUMENTS

| | | | | |
|---|---|---|---|---|
| 2008/0154470 | A1* | 6/2008 | Goranson | B60T 7/042 |
| | | | | 701/70 |
| 2016/0304199 | A1* | 10/2016 | Chan | B64D 27/26 |
| 2019/0263533 | A1* | 8/2019 | Nierlich | G05B 11/01 |
| 2022/0089274 | A1* | 3/2022 | Kirsch | B64C 13/50 |

* cited by examiner

Fig. 7 ns e.g., as described in EP 2 781 980 A1, can only be applied in a very small number of emergency cases.

METHOD OF CONTROLLING AN ACTIVATION SYSTEM, EMERGENCY CONTROL SYSTEM, AND AIRCRAFT EQUIPPED WITH SUCH SYSTEM

INCORPORATION BY REFERENCE

The following documents are incorporated herein by reference as if fully set forth: European Patent Application No. 19 169 586.5, filed Apr. 16, 2019.

TECHNICAL FIELD

The invention relates to a method of controlling an overly determined actuator system, said system having a first number of actuators, which first number is greater than a second number of actuators needed to perform a predetermined physical task with said actuator system.

The invention also relates to an emergency control system, in particular for use with a multi-actuator aerial vehicle, MAV, e.g., an electrically powered VTOL aircraft for transporting loads and/or passengers, for controlling an overly determined actuator system, said system having a first number of actuators, which first number is greater than a second number of actuators needed to perform a predetermined physical task with said actuator system, said actuators in particular being devised as propulsion units, in particular rotors/propellers, motor-propeller units, turbines or any other actuators/propulsion systems, which form part of said MAV.

Finally, the invention relates to an aircraft in the form of a multi-actuator aerial vehicle, MAV, e.g., an electrically powered VTOL aircraft for transporting loads and/or passengers.

BACKGROUND

EP 2 781 980 A1 discloses a method of flying an unmanned aerial vehicle (UAV) in response to emergency conditions. The method includes steps implemented by using a controller or control unit forming part of the unmanned aerial vehicle, said steps comprising: defining a plurality of emergency conditions; associating each emergency condition with a priority level; associating each emergency condition with an objective; sensing a plurality of operating parameters of the unmanned aerial vehicle to detect whether one of the plurality of emergency conditions exists; when one or more emergency condition is detected: generating a trajectory for the detected emergency condition having a highest associated priority level, wherein the trajectory is generated in accordance with the objective associated with the emergency condition that has the highest associated priority level; and instructing the unmanned aerial vehicle to follow the generated trajectory. In this way, depending on a detected emergency condition, a new trajectory for the UAV is planned. Further, each emergency condition has its own priority level, which means, e.g., in the event of an engine failure and a failure of the battery system being detected, the engine failure may be assigned a higher priority and therefore a new trajectory based on this emergency condition will be calculated.

This approach may be suitable for simple systems with a limited number of actuators or—in the case of an aircraft—a small number of engines, i.e., one or two actuators/engines. For overly determined systems with redundant propulsion capacities, such as Multi-actuator Aerial Vehicles (MAVs), the complexity is increased dramatically and known emergency systems, e.g., as described in EP 2 781 980 A1, can only be applied in a very small number of emergency cases.

In this context, the term "overly determined" means that the (actuator) system under consideration comprises more actuators than would be required to jointly perform a given physical task, e.g., safely moving an aircraft to a target location following a planned trajectory. In other words: the system comprises redundant actuator capacity.

There is a need for a method of operating an overly determined actuator system that does not suffer from the above disadvantages and which can be employed in a large number of emergency cases, in particular involving, but not limited to, Multi-actuator Aerial Vehicles (MAVs). There is also a need for an emergency control system that can be used with MAVs in order to increase aircraft safety.

SUMMARY

This object is achieved by a method, by an emergency control system, as well as by an aircraft having one or more of the features disclosed herein.

According to the invention, a method of controlling an overly determined actuator system, said system having a first number of actuators which first number is greater than a second number of actuators needed to perform a predetermined physical task with said actuator system, comprises the steps of: automatically controlling said first number of actuators by means of a control unit for jointly performing said predetermined physical task; repeatedly checking a functional state of said first number of actuators in order to detect an actuator failure of any one of said first number of actuators; in case of any detected actuator failure, generating at least one emergency signal representative of an adapted physical task to be performed by a remaining number of actuators, wherein said emergency signal is generated based on dynamics and kinematics, i.e., a known geometrical configuration, position and orientation of the actuators, of the actuator system, known physical capacities at least of the remaining actuators, and optionally on a computational performance model of the actuator system; wherein said adapted physical task comprises activating each of said remaining actuators below a predetermined threshold of maximum physical load on a respective actuator and activating the ensemble of remaining actuators in a way to prevent further damage to the actuator system. It is understood that the actuator system includes the first number of actuators and a body or structure to which they are attached.

Actuator failure is preferably detected with an algorithm. This algorithm accepts an actuator health status (e.g., motor has failed or has not failed/is healthy) from each actuator (and optionally the actuator's current state, e.g. a current RPM (rotation per minute) value for a rotor-motor unit). Furthermore, it preferably receives commanded actuator values computed by the control unit. Moreover, together with using an external disturbance observer (that utilizes known dynamics equations of the (actuator) system under consideration (e.g., an aircraft), computed actuator commands, known system parameters (e.g., mass, moment of inertia, aircraft geometry, which may be subject to some uncertainties) and available measurements/estimates of a system state, e.g., attitude, altitude, rotational velocities, and translational velocities (if available), this algorithm combines all these inputs and outputs with a probability value (between 0 and 1) for each actuator, where 0 indicates that the individual actuator failed with 0% probability and 1 indicates that the individual actuator failed with 100% probability. In case this probability value for any actuator is higher than a heuristically set value, then failure is detected for this particular actuator.

According to another aspect of the invention, an emergency control system, in particular for use with a multi-actuator aerial vehicle, MAV, e.g., an electrically powered VTOL aircraft for transporting loads and/or passengers, is proposed for controlling an overly determined actuator system, said system having a first number of actuators which first number is greater than a second number of actuators needed to perform a predetermined physical task with said actuator system, said actuators in particular being devised as propulsion units, e.g., rotors/propellers or motor-propeller units, which form part of said MAV, which emergency control system comprises: a control unit, in particular flight control unit, for automatically controlling said first number of actuators for jointly performing said predetermined physical task; a function for repeatedly checking a functional state of said first number of actuators in order to detect an actuator failure of any one of said first number of actuators; a further device or unit for, in case of any detected actuator failure, generating at least one emergency signal representative of an adapted physical task to be performed by a remaining number of actuators, wherein said emergency signal is generated based on kinematics (i.e., a known geometrical configuration, position and orientation of the actuators) of the overall actuator system, on known physical capacities at least of the remaining actuators, and optionally on a computational performance model of the overall actuator system; wherein said adapted physical task comprises activating, in particular by means of the control unit, each of said remaining actuators below a predetermined threshold of maximum physical load on a respective actuator and activating the ensemble of remaining actuators in a way to prevent further damage to the actuator system, e.g. an aircraft or MAV system; said emergency control system being optionally further adapted to perform a method according to any further development of the method according to the invention.

According to yet another aspect of the invention, an aircraft in the form of a multi-actuator aerial vehicle, MAV, e.g., an electrically powered VTOL aircraft for transporting loads and/or passengers, comprises: an overly determined actuator system, said system having a first number of actuators which first number is greater than a second number of actuators needed to perform a predetermined physical task with said actuator system, said actuators being devised as propulsion units, e.g. rotors/propellers or motor-propeller units, which form part of said aircraft; said aircraft further comprising the above-defined emergency control system according to the present invention.

It is therefore proposed—in the case of an MAV—to use an emergency system (hereinafter also referred to as "reflex indicator" or "reflex indicator algorithm", and its output as "emergency signal" or "reflex indication") which is adapted to calculate an optimized next flight direction or maneuver (a new or adapted trajectory) based on a specific failure scenario using the overall system kinematics, dynamics (and aerodynamics, if a model is available) and actuator capacities, i.e., based on the known physical capacities at least of the remaining actuators. Optimization can be achieved by considering the required load on the remaining "healthy" or functional actuators for jointly performing a given (new) physical task. "New" means that the task differs from the task that was originally assigned to the entirety of actuators (said first number of actuators). If this required load is not reasonably or evenly distributed, then the remaining actuators can also be subject to failure during performance of the new task. This may create a "butterfly effect" in overly determined actuator systems in general and MAVs in particular. This can lead to a catastrophic event.

In the context of the invention, a proposed next flight direction/maneuver (i.e., a joint behavior of the actuator system) can be indicated (e.g., visually, graphically, in text form, verbally or using haptic devices) to a pilot (an operator inside or outside of the MAV), or the information can be forwarded in the form of a suitable signal to an autopilot system (an automated control unit) for favoring a choice of safer trajectories (a safer overall system behavior). It is also possible that the MAV is remotely piloted, meaning that an operator can pilot the MAV from a base station via remote control.

Although throughout the present description reference is made to MAVs, the invention is by no means limited to such use but can be employed with other overly determined actuator systems as well.

The proposed emergency control system is advantageously used for overly determined systems, such as Multi-actuator Aerial Vehicles (MAVs) with redundant propulsion systems, which can preferably take-off and land vertically (VTOL). However, the proposed emergency control system and method can be used for various other aerial vehicle designs, as long as they are overly determined. In other words, the aircraft or MAVs considered here comprise a larger number of propulsion systems than they actually need for performing a stable flight. A particular emergency case, which can be considered in the context of the invention, consists of actuator failures, e.g. a propeller being hit by a bird or being switched off due to overheating. In the case of loss of one such propulsion system, the MAV would still be able to keep on flying.

In an embodiment of the invention, the (flight) control unit(s) sends actuator control commands to the actuators in a specific frequency and receives actuator functional status information (e.g., actuator is active, actuator is not active, or actuator should be turned off). This information (optionally together with the actuator's current state, e.g., for a rotor-motor unit its current RPM (rotation per minute) value, is processed in an actuator failure detection algorithm, as described above, which outputs if an individual actuator has failed. If any actuator failure is detected by the control unit, the emergency control system may determine and suggest an optimized next flight direction/maneuver, using the kinematics of the overall system (in this case the position and orientation of each actuator on the aerial vehicle) and the respective physical capacities (e.g., maximum thrust, torques, etc.) at least of the remaining actuators. Furthermore, the emergency control system may rely on an aerodynamics model of the aircraft, if available.

The actuator failure is detected in a failure detection algorithm, which uses the actuator health status (actuator functional information and optionally with actuator's current state, e.g., a current RPM (rotation per minute) value for a rotor-motor unit) delivered directly from the respective actuator control units (i.e., the actuators themselves). In a corresponding embodiment of the method according to the invention, repeatedly checking of the functional state of the said first number of actuators is performed by a failure detection algorithm which accepts at least one of the following inputs:

an actuator health status from each actuator;
commanded actuator values computed by the control unit;

output of an external disturbance observer, preferably utilizing known dynamics equations of the system under consideration;
computed actuator commands (computed, e.g., by the control unit);
known system parameters, particular mass, moment of inertia, system geometry, which may be subject to uncertainties;
available measurements/estimates of the system state, e.g., attitude, altitude, rotational velocities; and
translational velocities;
wherein said algorithm preferably combines all these inputs with a probability value between 0 and 1 for each actuator ($\alpha_i$), where 0 indicates that the individual actuator has failed with 0% probability and 1 indicates that the individual actuator has failed with 100% probability, and wherein said algorithm preferably detects a failure for a particular actuator ($\alpha_i$) if said probability value for this actuator ($\alpha_i$) is higher than a heuristically set value. Suitable sensor technology may be employed to obtain said system state measurements.

In an embodiment of the method according to the invention, said emergency signal is translated to a communication signal, e.g., visual, acoustical, and/or haptical, i.e., generally sensually perceivable for a human being, and is communicated to a human operator of the actuator system or of an MAV, which uses the actuator system, said communication signal being indicative of an operator action required to perform said adapted physical task.

In another embodiment of the method according to the invention, said emergency signal can be translated to a control signal and communicated to the control unit of the actuator system, said control signal being adapted to activate the remaining actuators to perform said adapted physical task. In this way, the emergency signal can be employed to directly influence system behaviour.

In yet another embodiment of the method according to the invention, the emergency signal is adapted to trigger an emergency procedure for saving the actuator system. In this way, further damage to the actuator system can be prevented.

In a further embodiment of the method according to the invention, said adapted physical task comprises shutting down the actuator system. While this is highly efficient, it may not be practical in the case the actuator system is devised as an aircraft.

In an embodiment of the method according to the invention, said actuator functional state is repeatedly communicated by the actuators to the (flight) control unit, to a plurality of (flight) control units, if present, or to a dedicated emergency control unit. In this way, the respective control unit is constantly aware of any failure condition within the actuator system, as described above by the failure detection algorithm.

In another embodiment of the method according to the invention, said actuator functional state is determined, by the (flight) control unit, by a plurality of (flight) control units, if present, or by a dedicated emergency control unit, based on any one or any combination of the following information: actuator health status from individual actuators (optionally with an actuator's current state, e.g., its RPM value), known system dynamics equations; computed actuator commands; known physical system parameters, e.g., mass, moment of inertia, geometry; available system state measurements or estimates, e.g., attitude, altitude, rotational velocities, translational velocities. In this way, even if the actuators do not repeatedly communicate their functional status in an active fashion, it can be derived from the above parameters, and any malfunctioning of actuators can be determined. Moreover, in this way, one can separate false-positive actuator failure conditions, e.g. in case when a healthy actuator sends a "malfunctioning" or "failure" health status/signal although it is actually healthy. By using the other means of detection (commanded actuator inputs and estimation using system dynamics, kinematics and actuator capacities), one can filter out these false-positive information. This increases the system redundancy which in turn improves the overall safety of the actuator system, e.g. an aircraft.

In yet another embodiment of the method according to the invention, at least one of the method steps is carried out by an algorithm installed on and performed by said (flight) control unit, by a plurality of (flight) control units, if present, or on/by a dedicated emergency control unit. This algorithm can be implemented in software and/or firmware or the like, which allows for easy verification and modification thereof.

In a further embodiment of the method according to the invention, said actuators are devised as propellers or motor-propeller units (i.e., propulsion units) which form part of a multi-actuator aerial vehicle, MAV, e.g., an electrically powered VTOL aircraft for transporting loads and/or passengers. Applicant has found that this is a highly advantageous use for the inventive method.

In a related embodiment of the method according to the invention, in the context of MAVs, said emergency signal is applied to a motion planning device (or an autopilot), which can be devised as a specially adapted computer unit, which motion planning device uses the emergency signal to adapt a pre-planned flight trajectory of the MAV and to determine at least one possible adapted flight trajectory. In other words: the emergency signal is used to directly alter the pre-planned flight trajectory of the MAV in order to prevent further damage to the propulsion units and—in consequence—to the entire aircraft.

In an embodiment of the method according to the invention related to MAVs, in the case of multiple possible adapted flight trajectories, the motion planning device automatically selects the possible adapted flight trajectory which is closest (e.g., geographically) to the pre-planned flight trajectory, and the control unit controls the remaining actuators accordingly; or, in the case of only one possible adapted flight trajectory, the motion planning device automatically suggests an overrule command and provides said overrule command to a trajectory tracking unit, which enables the MAV to at least locally deviate from said pre-planned flight trajectory. This overrule command suggests a transient phase from the moment of actuator failure(s) to the re-stabilization moment of the actuator system, where the actuator system locally deviates from the trajectory in a way that the remaining actuators and actuator system are safely recovered from the failure instant. This overrule command can be overruled again by the trajectory tracking unit, in case, e.g. of static or dynamic obstacle avoidance, or if the aircraft overshoots its safe predefined trajectory bounds.

In an embodiment of the method according to the invention, locally deviating from a pre-planned flight trajectory comprises: implementing a potential field covering at least a respective local area; and using the motion planning and/or the trajectory tracking device to at least locally recalculate the pre-planned flight trajectory based on said potential field. This calculation is done locally, hence it is computationally inexpensive, which is an advantage in case of time critic situations, e.g. recovering from actuator failures. The potential field preferably comprises a safe radius defining an (3D) ellipsoid, current state (position and velocity) and desired state (position and velocity) of the aircraft. In this case, the desired trajectory can be altered with a safe distance and velocity profile from the original desired trajectory, where this safe distance is defined by the radius of the aforementioned ellipsoid in 3D. Direction of this new desired trajectory is defined based on the reflex indicator/emergency signal (EM) provided by the reflex indicator.

In another embodiment of the method according to the invention, the motion planning device sets a geometrical or geographical extent, e.g., a radius, of said potential field; and the trajectory tracking unit decides whether or not local deviation is permitted, which may be done based on a presence of (static or dynamic) obstacles around the flight path (e.g. defined as geofences or detected during operation). Autopilot, motion planner and trajectory tracker have the highest priority, as human has for piloted operations.

The proposed reflex indicator algorithm can be used for any MAV, having any type and number of actuators, placed in any location on the vehicle, as long as the values and parameters mentioned above are known, and the system is overly determined (having a redundant number of actuators).

BRIEF DESCRIPTION OF THE DRAWINGS

Further details and advantages of the invention will now be explained in exemplary fashion based on the appended drawings.

DETAILED DESCRIPTION

Figure 1:
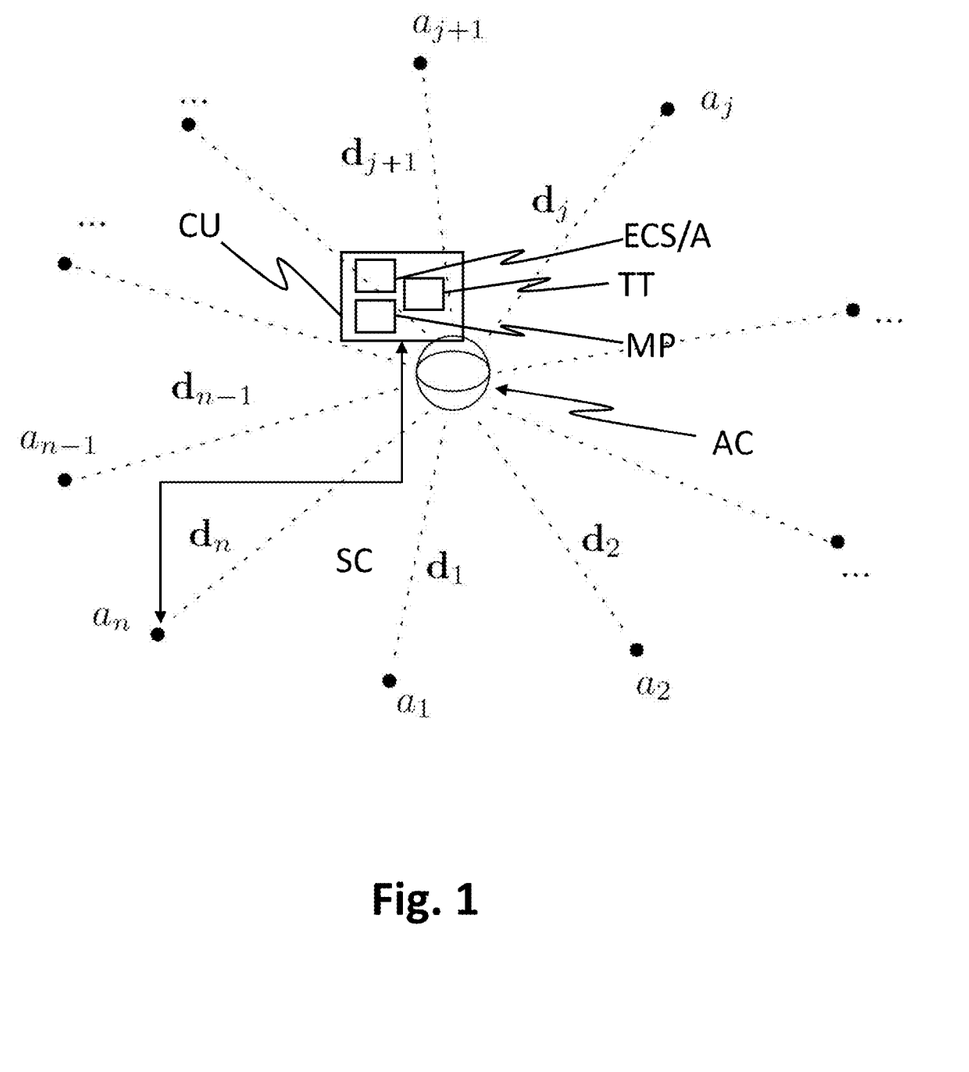
FIG. 1 shows a generic illustration of an MAV design.

A very generic illustration of an MAV design is presented in FIG. 1. Reference numerals $\alpha_i$, i=1, . . . , n; n∈ℕ, denote individual actuators, e.g., motors with rotors/propellers. Reference numerals $d_i$, i=1, . . . , n; n∈ℕ, denote the distance (in 3D space) of individual actuators $\alpha_i$ from an aircraft center AC, in particular a geometric center or the center of mass. Each of these actuators could be generating forces (e.g. lift) and torques in/around any direction, depending on their design. Note that the distance of an individual actuator to the center AC of the vehicle, depicted as $d_i$, could be any, i.e., they can be symmetrically placed around said center AC, but this is not mandatory. Reference numeral CU denotes a control unit, which can be a flight control unit of the aircraft, which is adapted to perform an emergency control system or algorithm denoted ECS/A. Control unit CU is in signal communication SC with every actuator $\alpha_i$, as shown in exemplary fashion for one single actuator. This signal communication SC comprises sending control signals (commands) to the actuators and receiving status information therefrom.

Figure 2:
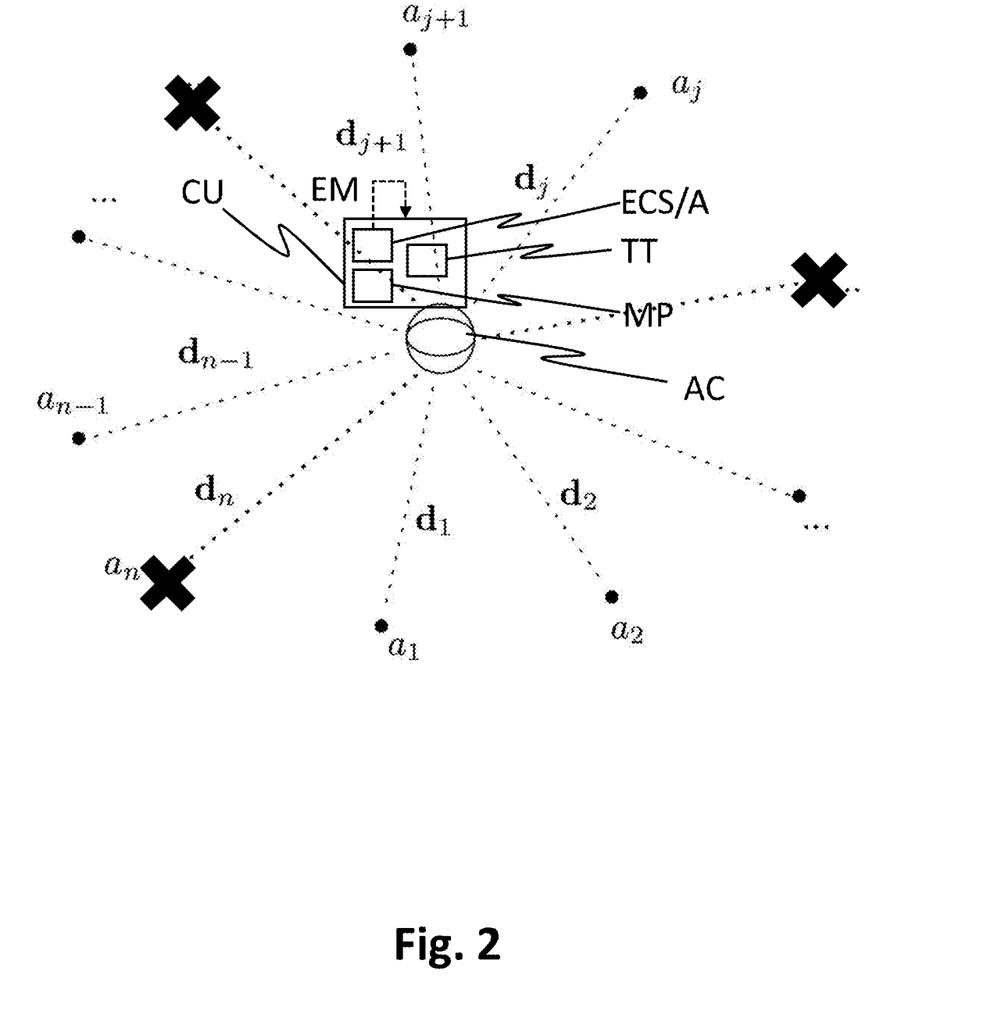
FIG. 2 shows the MAV of FIG. 1 in case of actuator failure.

FIG. 2 shows a case wherein k, k∈ℕ actuators out of n actuators experience failure, with k<n (e.g. in FIG. 2 k=3).

In FIG. 2, the failed actuators have been crossed out. If the aircraft can still perform stable flight with n-k actuators, this will be detected by the algorithm ECS/A (reflex indicator), and an optimum new direction or trajectory will be suggested to either pilot or an autopilot. This new direction is computed by the algorithm ECS/A in a way that the remaining (healthy) actuators $\alpha_i$ are not overloaded. If a stable flight is not possible at all, this is also computed in the algorithm (reflex indicator) ECS/A by comparing the available control volume with the required control action. Required control action is computed in the control unit (CU) using the desired aircraft state, current aircraft state and the known kinematics and dynamics of the aircraft. Available control volume consists of all physical forces and torques applicable to the aircraft body using only the remaining actuators, computed using the available actuators, their physical capabilities and geometry of the aircraft (e.g. the location of the actuators on the aircraft). In this case, the algorithm ECS/A returns an emergency message or signal EM, which can be used for triggering an emergency procedure, e.g., immediate landing. In particular, the emergency signal EM can be translated (e.g., by the control unit) to a communication signal and then communicated to a human operator of the actuator system (aircraft), said communication signal being indicative of an operator action required to perform an adapted physical task, i.e., follow an optimum new direction or trajectory. Alternatively, the emergency signal EM can be translated to a control signal and communicated to (or used by) the control unit of the actuator system, said control signal being adapted to activate the remaining actuators $\alpha_i$ to perform said adapted physical task.

In case of a piloted flight, this suggestion can be made using visualization on a screen (not shown). In case of an autopilot, the available information is used for trajectory re-planning purposes, using a motion or trajectory planning device MP comprised within control unit CU or in a separate and dedicated hardware. If trajectory planning device MP suggests multiple possible trajectories (e.g., multiple emergency exit plans, or different flight missions), the proposed algorithm ECS/A may weight these trajectories and propose the trajectory closest to the optimum direction. If trajectory planning device MP suggests only one possible trajectory, the proposed algorithm ECS/A sends a command for relaxing a trajectory tracking unit TT ("tracker"), which is a function or component comprised within the control unit CU or in a separate and dedicated hardware making sure that the MAV tracks the planned trajectories, in a way that tracker TT may overrule or overshoot the planned trajectory in a bounded way (if allowed) for the sake of saving the rest of the healthy actuators and hence avoiding any catastrophic event. This overrule command can be overruled again by tracker TT, in case, e.g., for static or dynamic obstacle avoidance, or if aircraft overshoots its safe pre-defined trajectory bounds. This overshoot from the planned trajectory is done locally, i.e., by implementing a potential field at that local area of the trajectory, which potential field is used by trajectory planning device MP to re-plan a new trajectory that is pushed away from the original one (in a bounded way using a safe radius) in the direction which algorithm ECS/A suggests. The potential field comprises a safe radius defining an (3D) ellipsoid, current state (position and velocity) and desire state (position and velocity) of the aircraft. In this case, the desired trajectory is altered with a safe distance and velocity profile from the original desired trajectory, where this safe distance is defined with the radius of the aforementioned ellipsoid in 3D. Direction of this new desired trajectory is defined based on the reflex indicator/emergency signal (EM) provided by the reflex indicator. In this case, reflex algorithm ECS/A sends the radius of the potential field to be used in the tracker TT. Tracker TT decides if this overshoot is allowed or not, based on the (static or dynamic) obstacles around the flight path (e.g. defined as geofences or detected during operation). Autopilot, motion planner and trajectory tracker have the highest priority, as human has during piloted operations.

Figure 3:
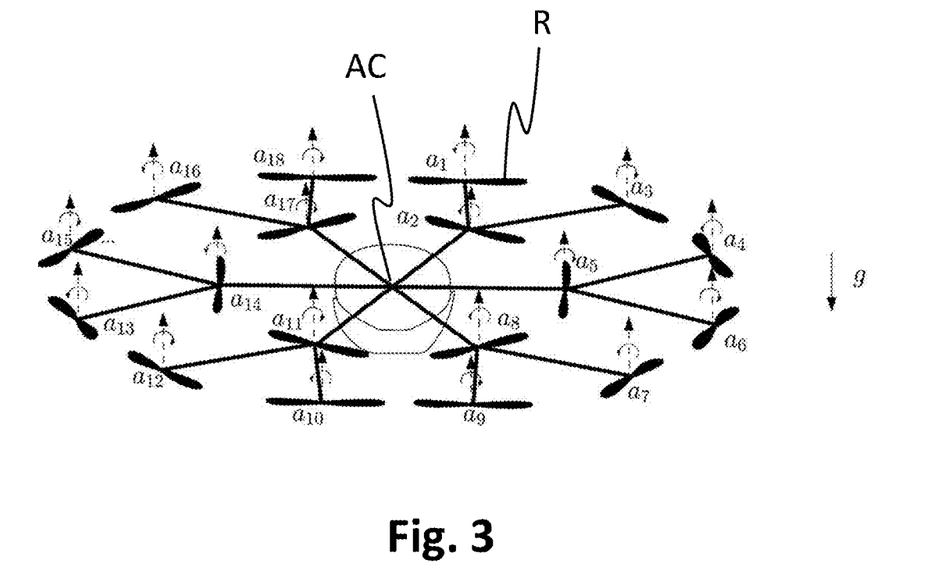
FIG. 3 shows are more detailed illustration of the MAV according to FIG. 1.
Figure 4:
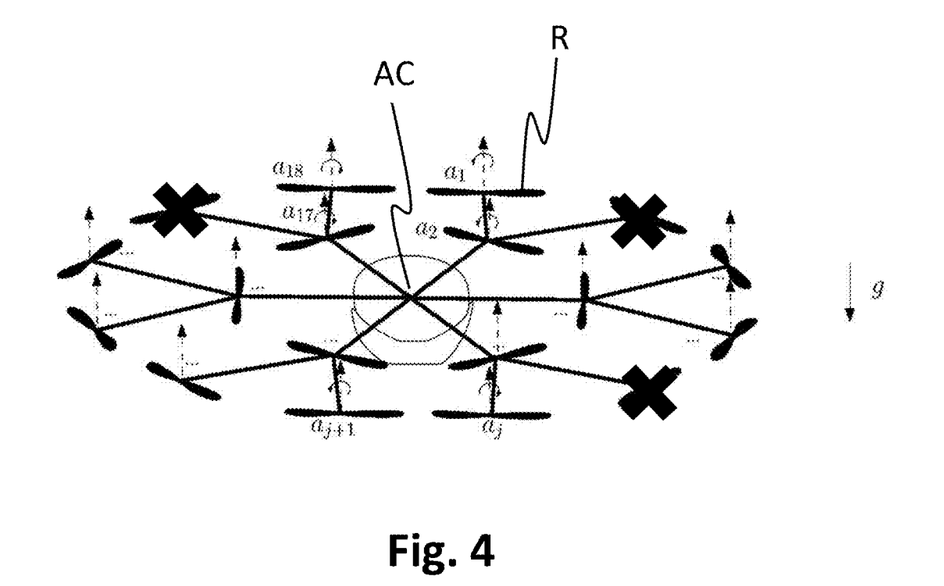
FIG. 4 shows are more detailed illustration of the MAV according to FIG. 2.

For a better understanding, the "Volocopter"® MAV design by the applicant can be taken as an example. Said design comprises 18 actuators $\alpha_i$ (each having a motor (not shown) and a propeller or rotor R), which are symmetrically placed in a doubly hexagonal pattern around the center AC of the MAV. This is depicted in FIG. 3 and FIG. 4. Vector g denotes gravitational acceleration. In FIG. 4, failed actuators are again crossed out, cf. FIG. 2.

According to FIG. 3, each one of the 18 propellers R is generating lift upwards and a drag moment on the counter direction of their rotation (rotation directions are depicted with circular arrows around the lift axis (up): actuators $\alpha_1$, $\alpha_2$, $\alpha_4$, $\alpha_7$, $\alpha_8$, $\alpha_{10}$, $\alpha_{13}$, $\alpha_{14}$, and $\alpha_{16}$ rotate counter clockwise and the remaining actuators rotate clockwise). Actuators $\alpha_1$ and $\alpha_{18}$ are assumed to be located in the front (in the direction of flight).

Figure 5:
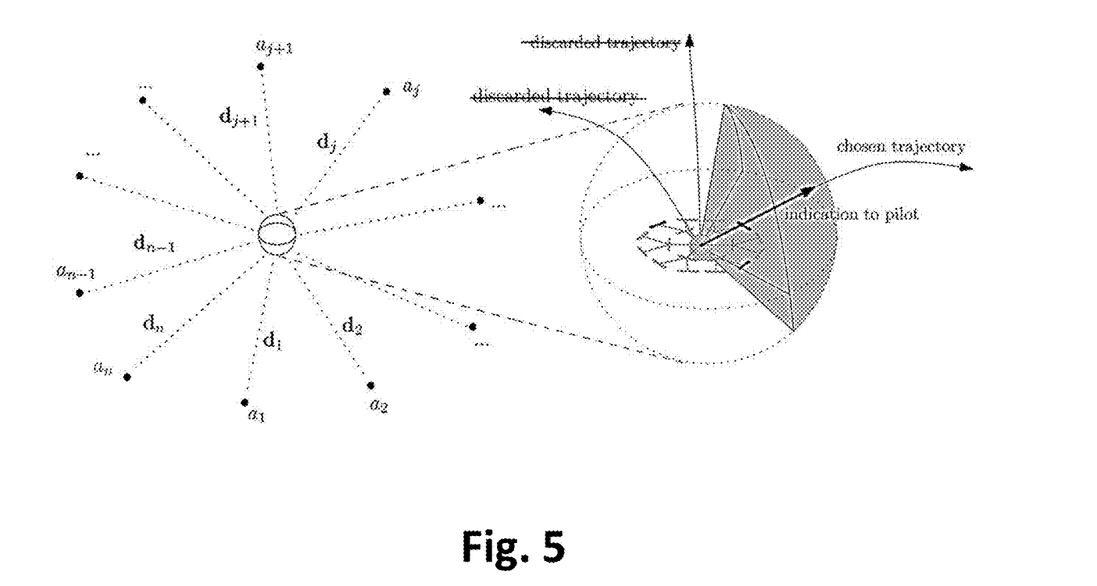
FIG. 5 shows a generic depiction of an optimum direction suggested by the reflex indicator in case of an actuator failure.

FIG. 5 shows a generic depiction of an optimum direction suggested by the reflex indicator in case of an actuator failure, cf. FIG. 2 or 4. In case of such a failure, the proposed reflex indicator algorithm ECS/A (cf. FIGS. 1 and 2) suggests a motion to either a pilot or an autopilot (e.g., a high-level real-time trajectory/path planner and tracker; cf. elements denotes MP and TT in FIGS. 1 and 2). This involves considering the available control volume of the vehicle, which covers all physical forces and torques applicable to the aircraft body using only the remaining actuators, computed using the available actuators, their physical capabilities and geometry of the aircraft (e.g. the location of the actuators on the aircraft). In FIG. 5 an example is shown, where the suggested motion belongs to the shaded region of the MAV's workspace in the instant of failure and at later times, and the thick arrow marked "indication to pilot" shows the suggested (new) direction of motion along the adapted trajectory ("chosen trajectory") indicated to the pilot, e.g. visually or graphically by means of a suitable display. In case an autopilot is used, the reflex indicator allows the trajectory planner to choose a trajectory option with less effort for the vehicle in terms of performing a stable flight in case of actuator failures. " Discarded trajectory " denotes a (pre-planned) trajectory which can no longer be followed due to the actuator failure. If multiple trajectories are available, the optimal one is chosen. If only one possible trajectory exists, then a local deviation using potential fields is suggested.

Figure 6:
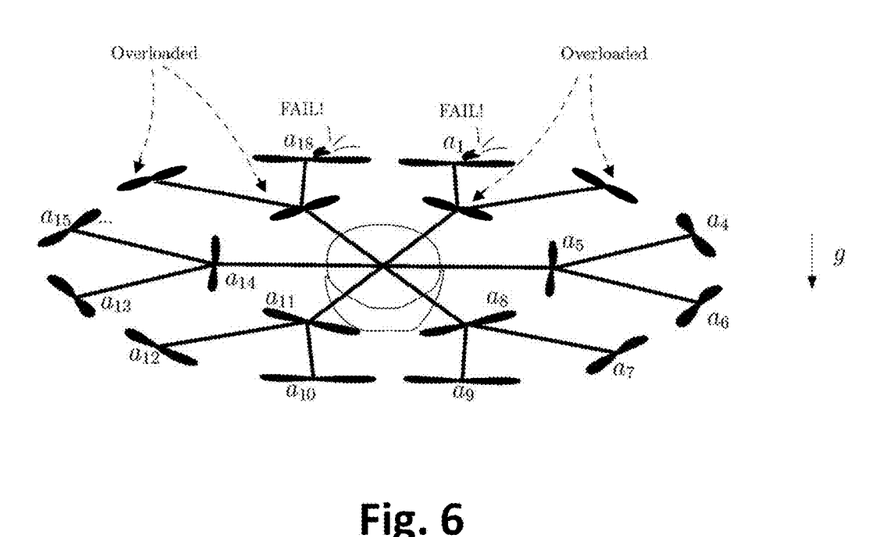
FIG. 6 shows are more detailed illustration of the MAV according to FIG. 1 during failure of two front actuators.

Consider now FIG. 6. If, for example, actuators 1 ($a_1$) and 18 ($a_{18}$) fail completely (e.g., due to a bird strike; marked "FAIL!" in FIG. 6) during a forward (cruise) flight, which are located at the front of the aircraft, then the MAV will pitch forward since it just has lost thrust/lift in the most forward position and therefore experiences a tilting moment in a forward down direction. Usually, flight control (control unit CU in FIGS. 1 and 2) would try to trigger actuators 16 ($a_{16}$), 17 ($a_{17}$), 2 ($a_2$) and 3 ($a_3$) (cf. FIG. 3), which are located adjacent to the failed actuators, to compensate for the loss of thrust from actuators 18 ($a_{18}$) and 1 ($a_1$), especially when, e.g., the cruise speed is being reduced by an autopilot or a pilot by tilting/pitching backwards, as a reaction to the actuator failures, for e.g. coming back to the hover condition. However, this can result in a so called "burning" (overloading) of these neighboring actuators (marked "Overloaded" in FIG. 6), which can eventually lead to losing these actuators as well. This could then lead to a catastrophic event.

Instead, the proposed reflex indicator algorithm ECS/A (cf. FIGS. 1 and 2) calculates a new optimum direction of the next flight path/maneuver, which minimizes the effort on the remaining actuators and forwards this information either to a pilot (e.g., as a visualization on a screen, or a "keep forward velocity" and "down before up" wording) or to an autopilot. Either of these two then decides, calculates or choses a new trajectory based on the input information provided by the emergency system (the reflex indicator). In any case, this involves activating each of the remaining actuators below a predetermined (or pre-set) threshold of maximum physical load on a respective actuator and thus activating the ensemble of the remaining actuators in a way to prevent further damage to the actuator system.

As another example, consider that the actuators 3, 6 and 9 of the MAV depicted in FIG. 3 fail. It should be noted that all these actuators are located on the right half-plane of the MAV (when looking from above). In case of this failure scenario, the MAV experiences a roll torque to the right (when looking from the rear) around the forward body axis. The overall system experiences a reduction in roll authority to its left side (when looking from above), which means that it is easier to roll the MAV to the right (in this case, the emergency indication for the pilot issued by the ECS/A could be "roll to right before left"). At the same time, it should be noted that the failed actuators all comprise clockwise rotating actuators/propellers. Hence in this failure case, the MAV experiences a yaw torque to the right (when looking from above). The overall system experiences a reduction in yaw authority to its left side (when looking from above), which means it is easier to yaw the MAV to the right (in this case, the emergency indication for the pilot issued by the ECS/A could be "yaw to right before left"). Without any loss of generalization, in case of an autopiloted MAV, this information is used for automatic re-planning of the flight trajectories (see, e.g., FIG. 5). Notice that the proposed algorithm computes these optimal directions automatically for any actuator failure combination, using the knowledge on the physical capacities of at least the remaining actuators and the geometry of the aerial vehicle (location of the actuators), physical and kinematics model of the aircraft and computed (and optionally also measured) actuator commands.

Depending on the phase of flight (e.g., in cruise velocity) the aerodynamics forces and torques acting on the vehicle might impact on the optimal direction suggested to the human pilot or to the autopilot. This depends on the structural geometry and the aerodynamics of the MAV and can be taken into account by the ECS/A.

Figure 7:
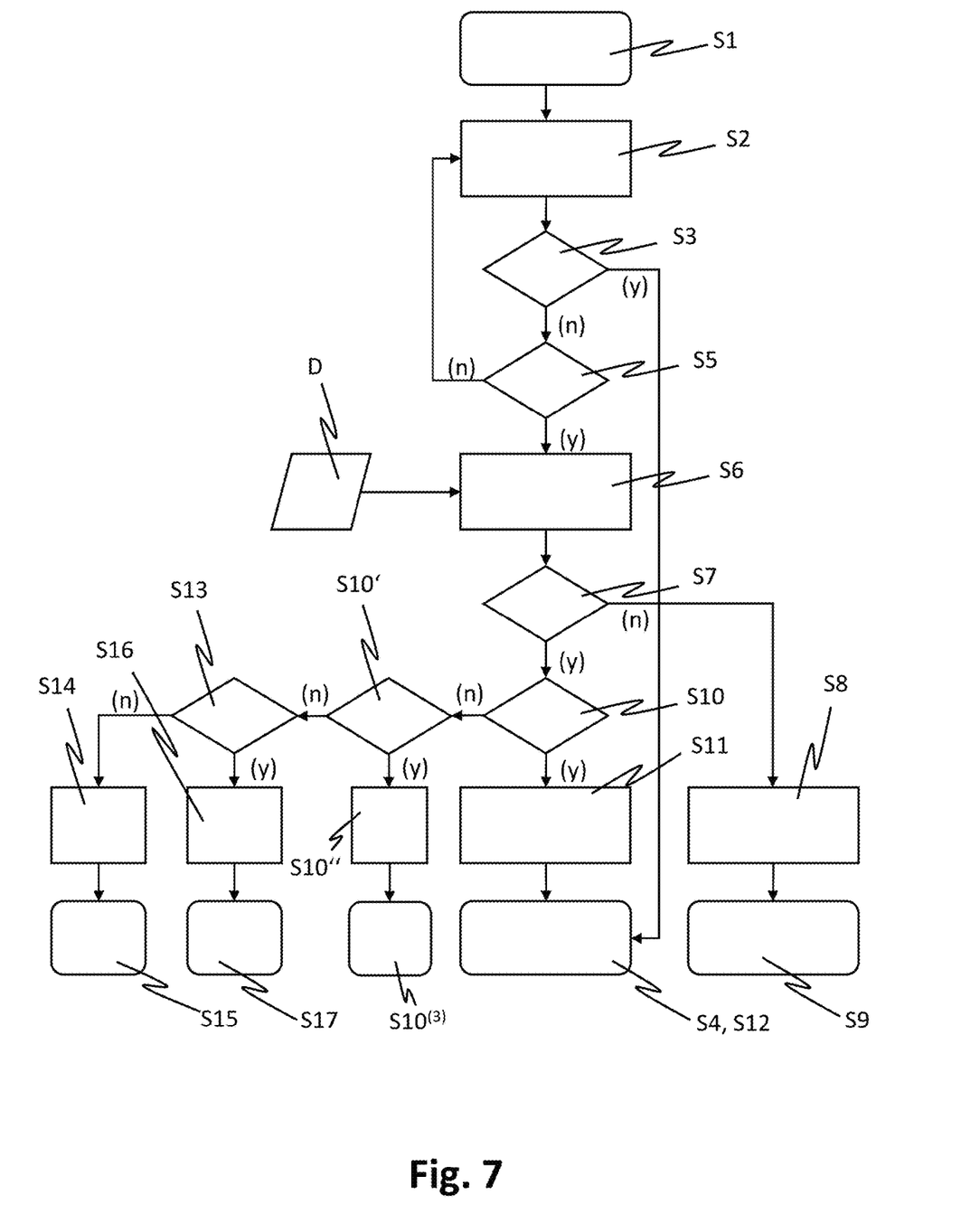
FIG. 7 shows a flowchart of an embodiment of the method according to the invention.

FIG. 7 shows a flow chart of an embodiment of the method according to the invention as applied to an MAV (cf. FIGS. 1 and 3).

The method starts with step S1. In step S2, the MAV follows a preplanned trajectory under control of control unit CU. In step S3, it is checked whether or not the MAV has reached its destination. If yes (y), the method ends with step S4. If not (n), then it is checked whether or not the MAV experiences any actuator failures in step S5. This is done in an actuator failure detection algorithm, which accepts an actuator health status (e.g., motor has failed or healthy) from each actuator (and optionally an actuator's current state, e.g., a current RPM value). Furthermore, it receives commanded actuator values computed by the control unit (CU). Moreover, together with using an external disturbance observer (that utilizes known dynamics equations of the system under consideration (e.g., the aircraft), computed actuator commands, known system parameters (e.g., mass, moment of inertia, aircraft geometry, which may be subject to some uncertainties) and available measurements/estimates of the system state, e.g., attitude, altitude, rotational velocities, and translational velocities (if available), this algorithm combines all of these inputs and outputs a probability value (between 0 and 1) for each actuator, where 0 indicates that the individual actuator has failed with 0% probability and 1 indicates that the individual actuator has failed with 100% probability. In case this probability value for any given actuator is higher than a heuristically set value, e.g. 50%, then an actuator failure is detected for this particular actuator. If no actuator failure is detected (n), the method returns to step S2. If yes (y), the method continues with step S6, which comprises determining (calculating) the impact of said failures on the overall aircraft behavior and then generating at least one emergency signal representative of an adapted flight trajectory with the remaining number of actuators, wherein said emergency signal is generated based on dynamics and kinematics of the overall aircraft system, on known physical capacities at least of the remaining actuators, and optionally on a computational performance model of the overall aircraft system. This comprises activating each of the remaining actuators below a predetermined threshold of maximum physical load on a respective actuator and activating the ensemble of remaining actuators in a way to prevent further damage to the actuator system. The required information and data for these decisions as used in step S6 is denoted D in FIG. 7. It may involve sensor measurement.

Based on the outcome of step S6, based on the nature of the emergency signal it is checked in step S7 whether or not the aircraft is still operational. If not (n), an emergency procedure is performed in step S8 in order to land the aircraft immediately, and the method ends with step S9. If yes (y), it is checked in step S10, whether or not the aircraft still can reach its original destination (on the originally pre-planned trajectory) without overloading other actuators. If yes (y), the current mission is continued (step S11), and the method ends with step S12 (cf. step S4). If not (n), and if it is a piloted flight (yes (y) in step S10'), reflex indicator suggests an optimal direction to the pilot (using, e.g., verbal/audial/haptical/visual means, cf. FIG. 5) in step S10'', whereupon the method ends with step S10$^{(3)}$. If it is an autopiloted flight (no (n) in step S10'), there is a further check in step S13, whether or not more than one alternative trajectory is available. If not (n), a deviation from the original trajectory is suggested to the tracker TT (cf. FIGS. 1 and 2) using the computation via potential fields, and the aircraft automatically follows the one alternative trajectory (if suggested trajectory does not violate other safety relevant conditions decided by the tracker, e.g. static and/or dynamic obstacles or if aircraft overshoots its safe pre-defined trajectory bounds) in step S14, and the method ends with step S15. If yes (y), the aircraft automatically selects an alternative trajectory, which is closest to the original one but at the same time avoids overloading the remaining actuators, in step S16 (cf. FIG. 5), and the method ends with step S17.

The invention claimed is:

1. A method of controlling an overly determined actuator system, said actuator system having a first number of actuators ($\alpha_i$), said first number of actuators is greater than a second number of said actuators needed to perform a predetermined physical task with said actuator system, said actuators comprise propulsion units that form part of a multi-actuator aerial vehicle, MAV, which is an electrically powered VTOL aircraft for transporting at least one of loads or passengers, the method comprising:
   automatically controlling said first number of actuators ($\alpha_i$) with a control unit (CU) for jointly performing said predetermined physical task;
   repeatedly checking a functional state of said first number of actuators ($\alpha_i$) in order to detect an actuator failure of any one of said first number of actuators ($\alpha_i$);
   in case of any detected actuator failure, generating at least one emergency signal (EM) representative of an adapted physical task to be performed by a remaining number of said actuators ($\alpha_i$), wherein said emergency signal (EM) is generated based on dynamics and kinematics of the actuator system, on known physical capacities at least of the remaining number of said actuators ($\alpha_i$), and optionally on a computational performance model of the actuator system;
   wherein said adapted physical task comprises activating each of said remaining actuators ($\alpha_i$) below a predetermined threshold of maximum physical load on any respective one of the actuators ($\alpha_i$) and activating an ensemble of said remaining actuators ($\alpha_i$) in a way to prevent further damage to the actuator system; and
   said emergency signal (EM) is applied to a motion planning device (MP), and said motion planning device (MP) uses the emergency signal (EM) to adapt a pre-planned flight trajectory of the MAV and to determine at least one possible adapted flight trajectory that is modified from the pre-planned flight trajectory.

2. The method of claim 1, wherein the repeatedly checking of the functional state of the said first number of actuators is performed by a failure detection algorithm which accepts at least one of the following inputs:
   an actuator health status from each said actuator ($\alpha_i$);
   commanded actuator values computed by the control unit (CU);
   output of an external disturbance observer;
   computed actuator commands;
   known system parameters, particular mass, moment of inertia, system geometry, which may be subject to uncertainties;
   available measurements/estimates of the system state, e.g., attitude, altitude, rotational velocities, and translational velocities;
wherein said algorithm combines at least a plurality of said inputs with a probability value between 0 and 1 for each said actuator ($\alpha_i$), where 0 indicates that the individual actuator has failed with 0% probability and 1 indicates that the individual actuator has failed with 100% probability, and wherein said algorithm detects a failure for a particular one of the actuators ($\alpha_i$) if said probability value for said particular one of said actuators ($\alpha_i$) is higher than a heuristically set value.

3. The method of claim 2, wherein at least one of the method steps is carried out by the algorithm (ECS/A) which is installed on and performed by at least one of said control unit (CU) or a dedicated emergency control unit.

4. The method of claim 1, further comprising translating said emergency signal (EM) to a control signal that is adapted to be communicated to the human pilot or is communicated to an auto-pilot of the actuator system, which uses the control unit (CU) in order to control the actuator system, said control signal being adapted to activate the remaining actuators ($\alpha_i$) to perform said adapted physical task.

5. The method of claim 1, wherein the emergency signal (EM) is adapted to trigger an emergency procedure for saving the actuator system.

6. The method of claim 1, wherein said adapted physical task comprises shutting down the actuator system.

7. The method of claim 1, wherein said actuator functional state is repeatedly communicated by the actuators ($\alpha_i$) to the control unit (CU) or to a dedicated emergency control unit.

8. A method of controlling an overly determined actuator system, said actuator system having a first number of actuators (a), said first number of actuators is greater than a second number of said actuators needed to perform a predetermined physical task with said actuator system, the method comprising:
   automatically controlling said first number of actuators ($\alpha_i$) with a control unit (CU) for jointly performing said predetermined physical task;
   repeatedly checking a functional state of said first number of actuators ($\alpha_i$) in order to detect an actuator failure of any one of said first number of actuators ($\alpha_i$);
   in case of any detected actuator failure, generating at least one emergency signal (EM) representative of an adapted physical task to be performed by a remaining number of said actuators ($\alpha_i$), wherein said emergency signal (EM) is generated based on dynamics and kinematics of the actuator system, on known physical capacities at least of the remaining number of said actuators ($\alpha_i$), and optionally on a computational performance model of the actuator system; and
   translating said emergency signal (EM) to a communication signal and that is adapted for communication to a human operator of the actuator system, said communication signal being indicative of an operator action required to perform said adapted physical task;
   wherein said adapted physical task comprises activating each of said remaining actuators ($\alpha_i$) below a predetermined threshold of maximum physical load on any respective one of the actuators ($\alpha_i$) and activating an ensemble of said remaining actuators ($\alpha_i$) in a way to prevent further damage to the actuator system.

9. A method of controlling an overly determined actuator system, said actuator system having a first number of actuators ($\alpha_i$), said first number of actuators is greater than a second number of said actuators needed to perform a predetermined physical task with said actuator system, the method comprising:
   automatically controlling said first number of actuators ($\alpha_i$) with a control unit (CU) for jointly performing said predetermined physical task;
   repeatedly checking a functional state of said first number of actuators ($\alpha_i$) in order to detect an actuator failure of any one of said first number of actuators ($\alpha_i$);
   in case of any detected actuator failure, generating at least one emergency signal (EM) representative of an adapted physical task to be performed by a remaining number of said actuators ($\alpha_i$), wherein said emergency signal (EM) is generated based on dynamics and kinematics of the actuator system, on known physical capacities at least of the remaining number of said actuators ($\alpha_i$), and optionally on a computational performance model of the actuator system;
   wherein said adapted physical task comprises activating each of said remaining actuators ($\alpha_i$) below a predetermined threshold of maximum physical load on any respective one of the actuators ($\alpha_i$) and activating an ensemble of said remaining actuators ($\alpha_i$) in a way to prevent further damage to the actuator system;
   wherein said emergency signal (EM) is applied to a motion planning device (MP), and said motion planning device (MP) uses the emergency signal (EM) to adapt a pre-planned flight trajectory of a multi-actuator aerial vehicle (MAV) and to determine an adapted flight trajectory that is modified from the pre-planned flight trajectory; and
   the motion planning device (MP) automatically suggests an overrule command and provides said overrule command to a trajectory tracking unit (TT), which enables the MAV to at least locally deviate from said pre-planned flight trajectory.

10. The method of claim 9, wherein locally deviating from a pre-planned flight trajectory comprises:
   implementing a potential field covering at least a respective local area; and
   using at least one of the motion planning device (MP) or the trajectory tracking unit (TT) to at least locally recalculate the pre-planned flight trajectory based on said potential field.

11. The method of claim 10, wherein the motion planning device (MP) sets a geometrical or geographical extent of said potential field; and
   the trajectory tracking unit (TT) decides whether or not local deviation is permitted.

12. An emergency control system for controlling an overly determined actuator system, said system having a first number of actuators ($\alpha_i$) and said first number of actuators is greater than a second number of the actuators needed to perform a predetermined physical task with said actuator system, the emergency control system comprising:
   a control unit (CU) that automatically controls said first number of actuators ($\alpha_i$) for jointly performing said predetermined physical task;
   a function for repeatedly checking a functional state of said first number of actuators ($\alpha_i$) in order to detect an actuator failure of any one of said first number of actuators ($\alpha_i$);
   a emergency signal device or unit (ECS/A) that, in case of any detected actuator failure, is configured to generate at least one emergency signal (EM) representative of an adapted physical task to be performed by a remaining number of said actuators ($\alpha_i$), said emergency signal (EM) is generated based on kinematics of the overall actuator system, on known physical capacities at least of the remaining actuators ($\alpha_i$), and optionally on a computational performance model of the overall actuator system;
   wherein said adapted physical task comprises activating each of said remaining actuators ($\alpha_i$) below a predetermined threshold of maximum physical load on a respective one of the actuators ($\alpha_i$) and activating an ensemble of the remaining actuators ($\alpha_i$) in a way to prevent further damage to the actuator system;
   wherein the system is configured for use with a multi-actuator aerial vehicle, MAV, comprising an electrically powered VTOL aircraft for transporting at least one of loads or passengers, said actuators ($\alpha_i$) comprise propulsion units which form part of said MAV, and the control unit comprises a flight control unit; and
   the control unit is configured to apply said emergency signal (EM) to a motion planning device (MP), and said motion planning device (MP) uses the emergency signal (EM) to adapt a pre-planned flight trajectory of the MAV and to determine at least one possible adapted flight trajectory that is modified from the pre-planned flight trajectory.

13. An aircraft comprising a multi-actuator aerial vehicle, MAV, formed as an electrically powered VTOL aircraft for transporting at least one of loads or passengers, said aircraft comprising:
   an overly determined actuator system having a first number of actuators ($\alpha_i$) and said first number of actuators is greater than a second number of said actuators needed to perform a predetermined physical task with said actuator system, said actuators ($\alpha_i$) comprising propulsion units; and
   the emergency control system according to claim 12.

14. The aircraft of claim 13, wherein the propulsion units comprise rotors/propellers (R) or motor-propeller units.

* * * * *